United States Patent

[11] 3,631,998

| [72] | Inventor | Ian Gordon George Fowell<br>London, England |
|---|---|---|
| [21] | Appl. No. | 67,962 |
| [22] | Filed | Aug. 28, 1970 |
| [45] | Patented | Jan. 4, 1972 |
| [73] | Assignee | Cooper Bros. (Bordesley) Limited<br>Birmingham, England |
| [32] | Priority | Aug. 29, 1969 |
| [33] | | Switzerland |
| [31] | | 13113/69 |

[54] CONTAINER-CARRYING TRUCKS
6 Claims, 4 Drawing Figs.

[52] U.S. Cl. .................................................. 214/313, 298/11
[51] Int. Cl. ................................................... B65f 3/04
[50] Field of Search ......................................... 298/11; 214/313, 502, 390, 302

[56] References Cited
UNITED STATES PATENTS

| 2,527,369 | 10/1950 | Meyer .......................... | 298/11 |
| 2,672,247 | 3/1954 | Jewett ......................... | 298/11 |

*Primary Examiner*—Albert J. Makay
*Assistant Examiner*—Lawrence J. Oresky
*Attorney*—Lowry, Rinehart, Markva & Smith

ABSTRACT: A container-carrying truck includes a primary cradle and a secondary cradle. The secondary cradle is pivoted at one end to the truck and pivoted at its other end to the primary cradle. A ram is pivoted to the truck and to the primary cradle and link means are pivoted to the secondary cradle and arranged to support the primary cradle at a position spaced from the pivotal connection between the two cradles. On extension of the ram, the primary cradle is moved first upwardly in a generally horizontal condition and is then tilted.

INVENTOR
IAN GORDON GEORGE FOWELL
BY: Markva, Smith & Kruger
ATTORNEYS

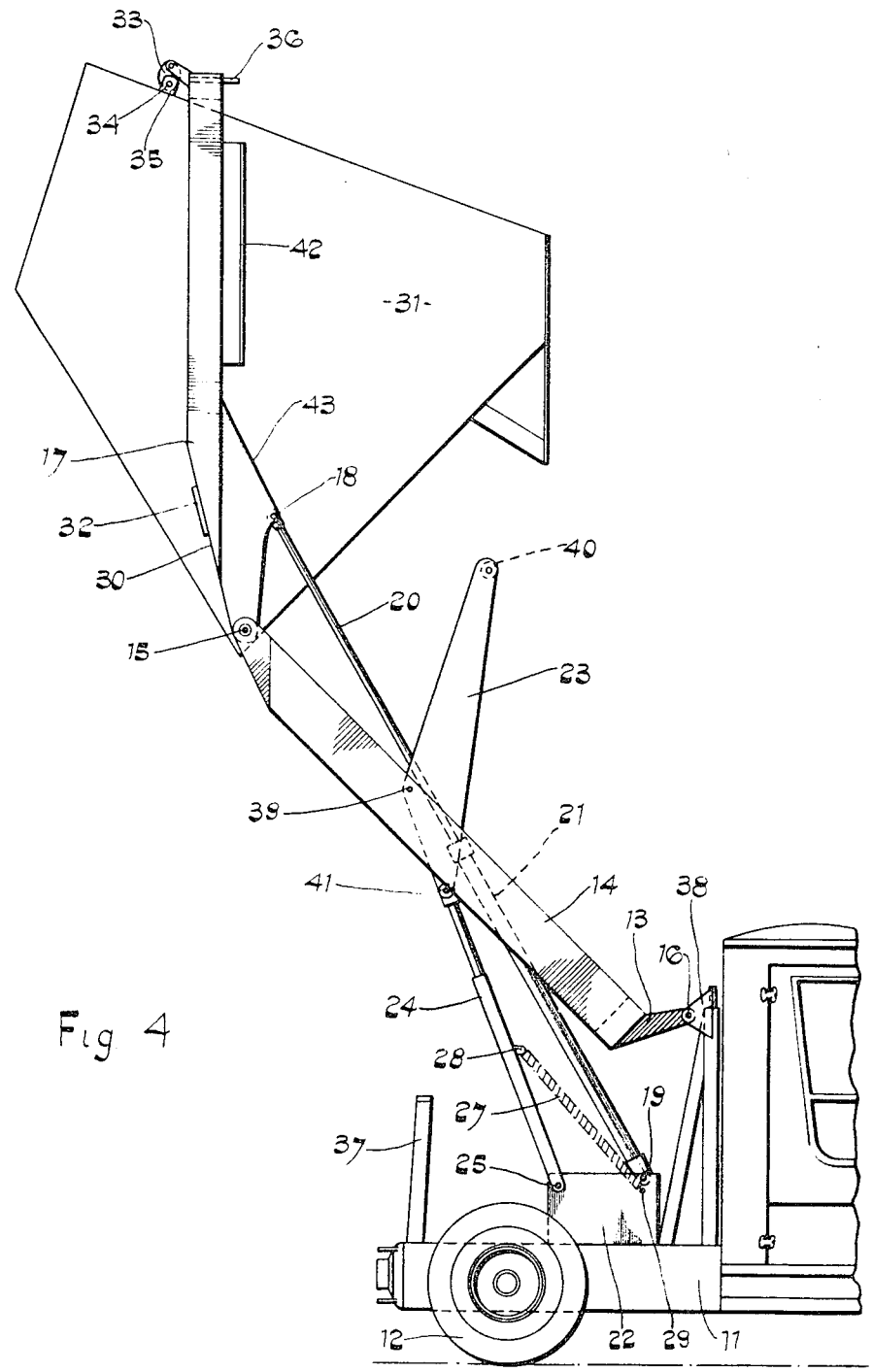

CONTAINER-CARRYING TRUCKS

BACKGROUND OF THE INVENTION

1. Field of the Invention

This invention relates to trucks which are adapted to be used for picking up a container or bin from a freestanding position on the ground or like supporting surface, conveying the container or bin to a discharge point, discharging the contents of said container or bin by tilting the container or bin at said point and thereafter returning the container or bin to a freestanding position.

2. Description of the Prior Art

British Pat. specification No. 769,795 discloses a container-carrying truck of the above kind which is particularly intended for use in quarries and the discharge mechanism of that truck is such that tilting of the container is effected when the container has been raised a comparatively small distance above its transport or conveying position.

It is an object of the present invention to provide an improved form of container-carrying truck of the above kind in which the container supporting and discharge means are such as to permit the container to be raised several feet above its transport or conveying position prior to tilting thereof to permit use of the truck for the transfer of goods or materials to a hopper or other receiver having a receiving opening located some distance above ground level.

SUMMARY OF THE INVENTION

The container supporting and discharging means of the truck includes a primary cradle, ram means pivotally connected to a fixed part of the truck and to the primary cradle, a secondary cradle pivoted at its one end to the primary cradle adjacent the position of pivotal connection of the ram means to the primary cradle, said secondary cradle being pivoted at its other end to a fixed part of the truck, link means being pivoted to said secondary cradle and supporting said primary cradle at a position spaced from said pivotal connections and adapted in cooperation with said ram means to effect substantially straight-line movement of said primary cradle in response to extension of said ram means and stop means for limiting cooperative movement of said link means and said ram means whereby continued extension of said ram means causes tilting of the primary cradle.

DESCRIPTION OF THE PREFERRED EMBODIMENT

Figure 2:
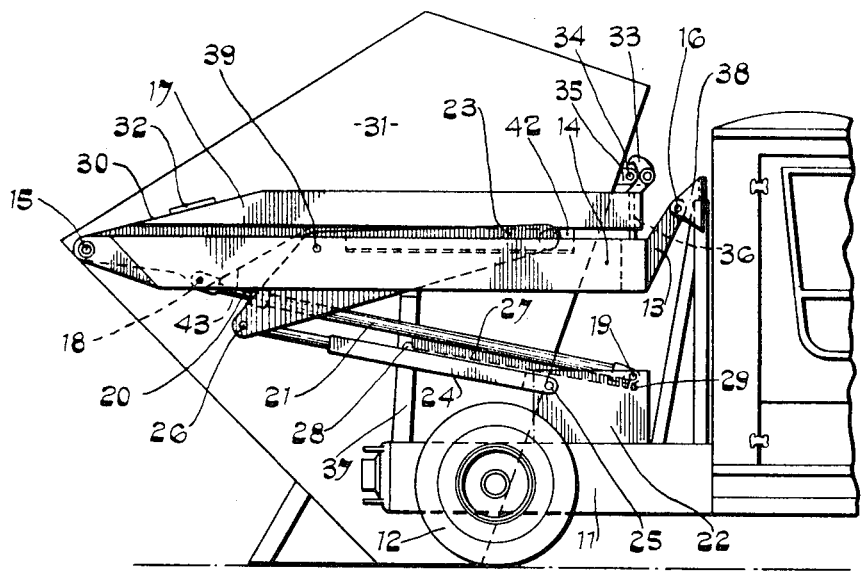
FIG. 2 is a somewhat diagrammatic side view of the truck with the body of the truck not shown and with the container-supporting means in its lowered position.

The truck (of which the body has been omitted for convenience from FIGS. 2 to 4) includes a rearwardly extending chassis member 11 which supports a suitable ground-engaging wheel 12. Depending downwardly from the rear frame 10 at each side thereof is a swing arm 13. The swing arms 13 are pivoted to brackets 38 on upright members of the frame 10 and support a lower secondary cradle 14 which, at its front end, is pivoted to an upper primary cradle 17. The two cradles 14 and 17 are arranged for movement relative to each other about a pivot axis 15 and the secondary cradle is arranged to move relative to the frame 10 about a pivot axis 16.

The primary cradle 17 is of "U" shape in plane and each side limb thereof provides means for the pivotal mounting of the piston 20 of a hydraulic ram whose cylinder 21 is pivotally connected to an upstanding support 22 carried by the frame 10. There is a pivot axis 18 between the piston 20 and the primary cradle 17 and a pivot axis 19 between the cylinder 21 and the support 22. Thus a pair of rams are provided, one on each side of the truck and at the rear thereof, each ram being pivotally connected between the truck and one limb of the U-shaped primary cradle 17, with the limbs of the cradle 17 shaped as shown most clearly in FIGS. 3 and 4.

Pivotally connected to each side limb of the secondary cradle 14 is a bellcrank lever 23 which is also pivotally connected to a nonextensible but adjustable strut 24 whose other end is pivotally connected to the support 22 for pivotal movement relative thereto about an axis 25 spaced from axis 19. The lever 23 is pivoted at 26 to the strut 24 and a pair of springs 27 act between a mounting position 28 intermediate the ends of strut 24 and a mounting position 29 on said support 22.

The primary cradle 17 is formed at its rearward end with upwardly facing inclined surfaces 30 (see FIG. 4) and the container 31 is provided with a pair of inclined plates 32, one at each side thereof, for engagement with the inclined surfaces of the arms of the primary cradle 17. The plates 32 ride up the inclined surfaces on engagement of the truck with the container and latch means (not shown) can be provided which are operative to hold the container in engagement with the primary cradle, said latch means operating automatically upon a predetermined degree of riding up of the plates along the inclined surfaces.

The transverse limb of the primary cradle 17 carries a centrally disposed latch member which includes a pair of upstanding lugs which pivotally support a hook member 33. Hook member 33 extends from the lugs towards the container and has a curved recess adjustment its free end, the opening of the recess being directed downwards. The recess is adapted to engage with a rod 34 which extends transversely of the container and is secured thereto by a pair of brackets 35, one adjacent each of a pair of opposed edges of the container.

Intermediate the recess and the lugs, the hook member 33 has a nose portion which engages with a push rod 36 which is slidingly housed in a bore formed vertically through the transverse limb of the primary cradle 17. The push rod 36 extends below the lower surface of the transverse limb and includes an increased-diameter head portion whereby it is prevented from slipping out of the bore under the action of gravity. In the lowered or "pickup" position of the container supporting and discharge means, the lower end of the push rod 36 engages with the upper surface of part of the secondary cradle 14 so that the push rod 36 is displaced upwards, thus bearing on the nose portion of the hook member 33 which is thereby lifted to a disengaged position.

The chassis member 11 can carry an upstanding pillar 37 which serves to support the secondary cradle 14 when it is in its pickup position.

In operation, extension of the ram 20 causes lifting of the primary cradle 17 and the container 31 carried thereby and simultaneously causes pivotal movement of the secondary cradle 14 about axis 16 and relative pivotal movement between the secondary cradle 14 and the primary cradle 17 about axis 14. Such swinging movement of the secondary cradle 14 causes the bellcrank lever 23 to pivot about its pivotal connection 39 with the secondary cradle 14. As a result of the bellcrank lever 23 being connected to the strut 24, this causes the rear of the bellcrank lever 23 to left so that a roller or like abutment member 40 carried thereby engages the rear of the primary cradle 17 and continued extension of the ram 20 causes movement of the bellcrank lever 23 so as to lift the rear of the primary cradle 17 at approximately the same rate as the front is lifted by the ram 20 so that the primary cradle 20 is lifted in a substantially horizontal condition.

Figure 1:
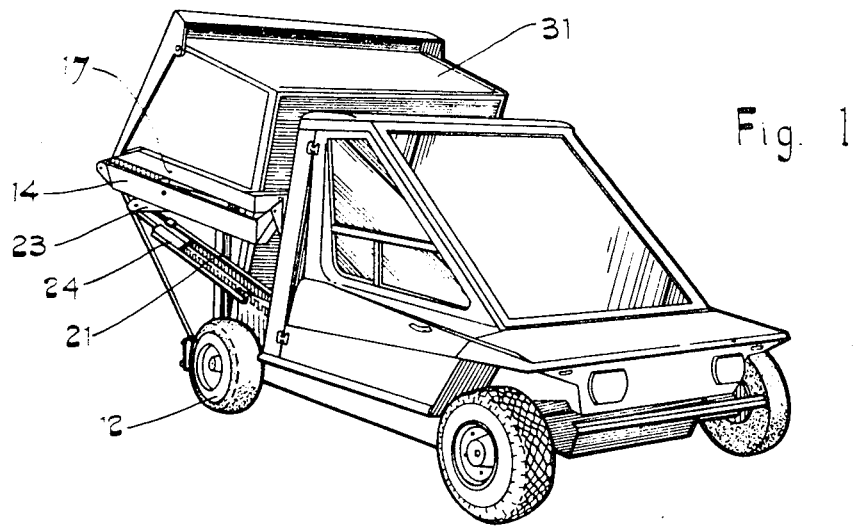
FIG. 1 is a perspective view of a container-carrying truck with the container-supporting means thereof in a position corresponding to the container having been lifted a short distance from the ground.

As the primary cradle 17 rises relative to the secondary cradle 14, the push rod 36 falls under the action of gravity and the hook member 33 thus drops into an engaged position, the recess engaging with the rod 34 on the container 31 which is thereby located and held in position. As the container 31 is raised it is supported at the front by the brackets 35 which rest on the upper surface of the primary cradle 17 and at the rear by the inclined plates 32 which rest on surfaces 34. To transport the container 31, the primary cradle 17 is raised a distance such that the container clears the ground and the underside of the container 31 is at substantially the same level as the underside of the chassis member 11. This condition is shown in FIG. 1.

Figure 3:
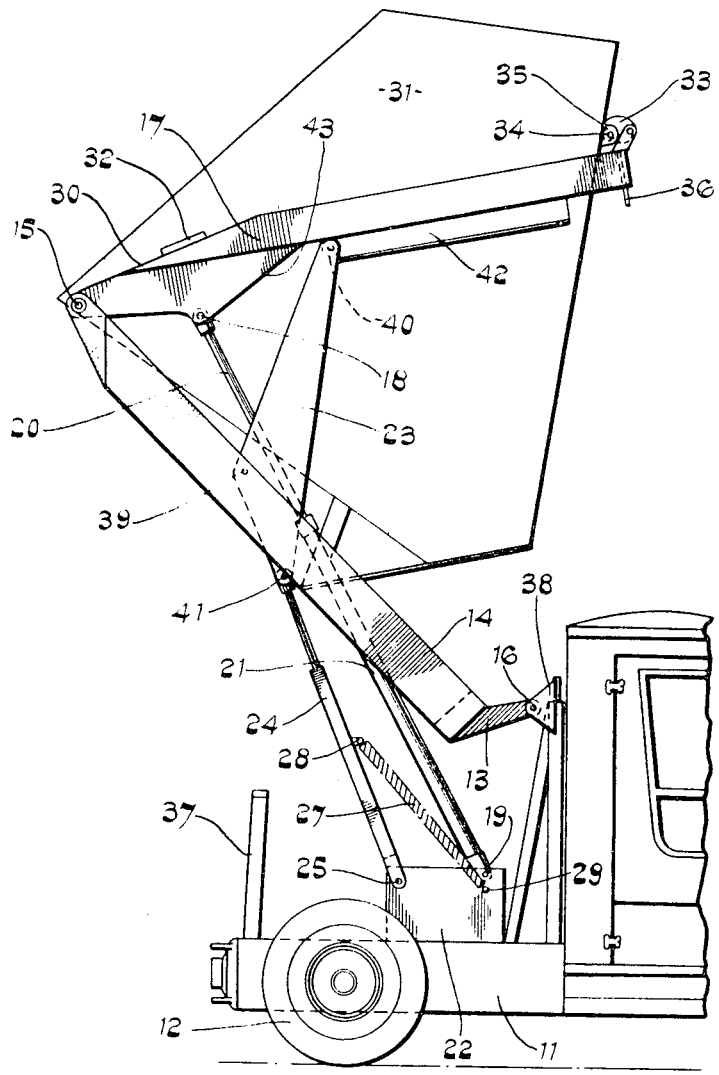
FIG. 3 is a side view corresponding to FIG. 2 but with the container-supporting means in its elevated position and, FIG. 4 is a further side view corresponding to FIG. 2 but with the container-supporting means in its tipping position.

The bellcrank lever 23 and the strut 24 are so arranged that, as the primary cradle 17 and the container 31 carried thereby approach the position shown in FIG. 3 in which the container is to be moved into the tilted discharge position shown in FIG. 4, the lever 23 and strut 24 are approaching an "in-line" position in which the axes 25, 26, and 39 are aligned. Stop means 41 are provided whereby further relative movement between the strut 24 and the lever 23 is prevented, thus preventing further tilting movement of the secondary cradle 14. The stop means 41 is constituted by transverse extensions of a spindle connecting the lever 23 with the strut 24, which transverse extensions engage the undersurface of the secondary cradle 14. When the lever 23 and the strut 24 are in this in-line position, they are held therein by the springs 27. The bellcrank lever 23 comprises a pair of plates secured together in spaced-parallel relationship and the abutment member 40 provided on the lever 23 takes the form of a pair of bosses, one fixed to each plate and projecting towards the other with clearance between the two bosses. An I-section member 42 is secured to the underside of each side limb of the primary cradle 17 and the arrangement is such that, during movement of the primary cradle 17 from the position shown in FIG. 2 into the position shown in FIG. 3, the bosses 40 on the lower 23 will move along the length of the I-section member 42 until, in the position shown in FIG. 3, the bosses become clear of the I-section member 42. When the position shown in FIG. 3 is reached, the primary cradle 17 is free to move about the pivot axis 15 relative to the secondary cradle 14 but the secondary cradle 14 is prevented from moving about its pivot axis 16.

Further extension of the ram after the position shown in FIG. 3 has been reached thus causes the primary cradle 17 and thus the container 31 carried thereby to pivot about the pivot axis 15 thus tilting the container into the discharge position.

After discharge of the contents of the container 31, the ram 20 is retracted and this will cause the primary cradle 17 and container 31 to pivot back into a generally horizontal position and as this horizontal position is approached, inclined surfaces 43 on the primary cradle 17 will engage the abutment bosses 40 and guide them so as to move into alignment with the associated I-section element 42 so that, on continued retraction of the ram 20, the primary cradle 17 will move further downwards and the secondary cradle 14 together with the bellcrank lever 23 and the strut 24 will return to their original positions.

It is envisaged that initial pickup and lift movement for the container will be some 20 cm. and in this position the container will be moved by the truck from the pickup point to the discharge point. It is also envisaged that the distance by which the container will be raised from its transport position will be approximately 2 meters permitting the discharge of the contents of the container into a hopper or other receiver having a receiving opening disposed about 2 meters above ground level. During such lifting of the container 31, the rearward end of the primary cradle 17 is raised directly by the ram means and the forward end thereof is raised by the linkage system constituted by the secondary cradle 14, the bellcrank 23 and the strut 24. To engage a container 31, a truck is backed into the appropriate position so that the inclined surfaces 30 of the primary cradle 17 engage the inclined plates 32 and, to deposit a container on the ground, the container 31 is lowered, during which lowering the hook member 33 is disengaged from the rod 34 so that, when the truck is then driven away, the container will be left behind.

I claim:

1. A container-carrying truck having container supporting and discharge means which includes a primary cradle, ram means pivotally connected to a fixed part of said truck and to said primary cradle, a secondary cradle pivoted at its one end to the primary cradle adjacent the position of pivotal connection of the ram means to the primary cradle, said secondary cradle being pivoted at its other end to a fixed part of the truck, link means pivoted to said secondary cradle and supporting said primary cradle at a position spaced from said pivotal connections and adapted in cooperation with said ram means to effect substantially straight-line movement of said primary cradle in response to extension of said ram means and stop means for limiting cooperative movement of said link means and said ram means whereby continued extension of said ram means causes tilting of the primary cradle.

2. A truck according to claim 1 wherein said primary cradle has first means arranged to engage abutment means at one end of the container and second means for engaging abutment means at the other end of the container.

3. A truck according to claim 1 wherein the link means includes a bellcrank lever pivotally connected to the secondary cradle and a strut pivotally connected to the truck, one arm of the bellcrank lever being pivotally connected to one end of the truck and the other arm of the bellcrank lever being arranged to engage the underside of the primary cradle intermediate its ends.

4. A truck according to claim 3 wherein the stop means comprises extensions of a spindle connecting the bell crank lever with the strut, which extensions are arranged to engage the undersurface of the secondary cradle.

5. A truck according to claim 4 in which spring means are provided acting on the strut to hold the bellcrank lever and the strut in the position in which said extensions engage the undersurface of the secondary cradle.

6. A truck according to claim 1 wherein a hook is provided on the primary cradle for engagement with a rod on the container and wherein a push rod is mounted in a bore in the primary cradle and is movable, on engagement with the secondary cradle, between a position in which the hook engages the rod and a position in which the hook is disengaged from the rod.

* * * * *